April 8, 1930. J. A. KIDD 1,753,433
AEROPLANE WING HEATER
Filed July 2, 1928  2 Sheets-Sheet 1
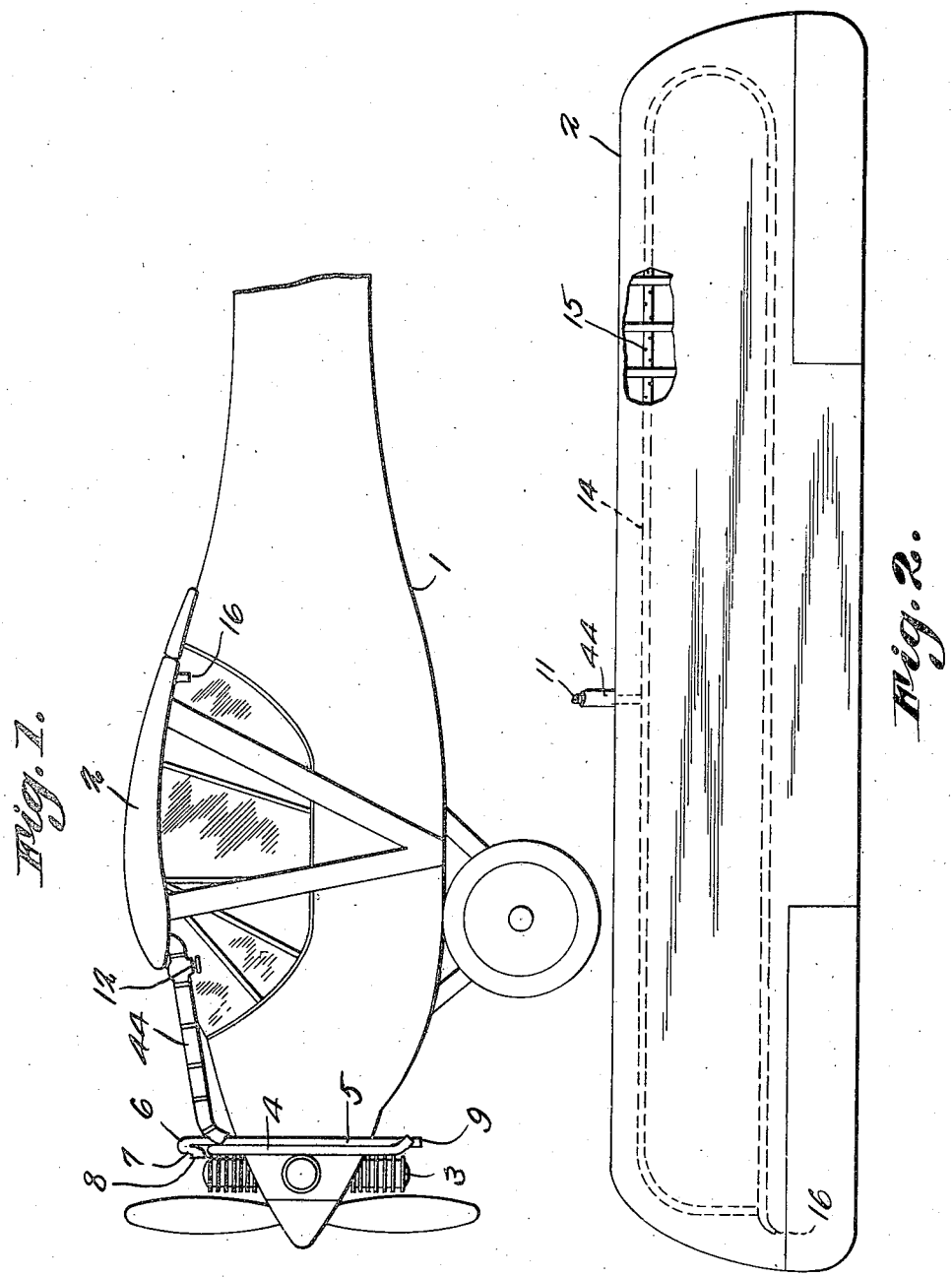

April 8, 1930.　　　　　J. A. KIDD　　　　　1,753,433
AEROPLANE WING HEATER
Filed July 2, 1928　　　2 Sheets-Sheet 2

Patented Apr. 8, 1930

1,753,433

UNITED STATES PATENT OFFICE

JAMES A. KIDD, OF PETERSBURG, VIRGINIA

AEROPLANE-WING HEATER

Application filed July 2, 1928. Serial No. 289,755.

This invention aims to provide a simple means whereby the wings of an aeroplane may be heated from the exhaust of the engine which drives the plane.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:—

Figure 1 shows in side elevation, an aeroplane equipped with the device forming the subject matter of this application, parts being broken away;

Figure 2 is a top plan of the plane, parts being broken away;

Figure 3 is an elevation wherein the device forming the subject matter of this application is shown in relation to the engine which drives the air craft;

Figure 5 is a section taken through one of the wings of the plane;

The numeral 1 indicates the fuselage of an aeroplane, the wings being shown at 2. The engine is designated by the numeral 3 and according to the present practice is an internal combustion engine, the exhaust manifold of which is designated by the numeral 4.

Figure 4:
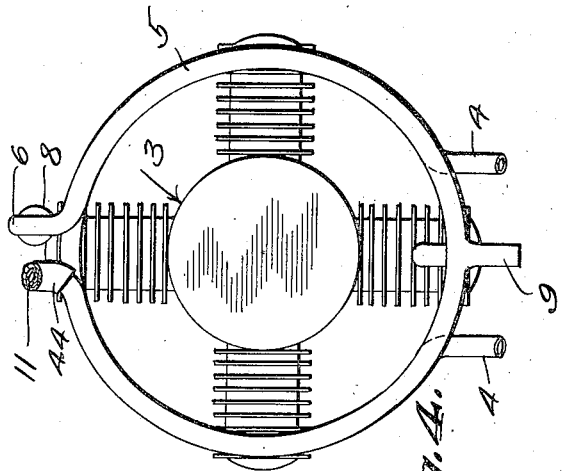
Figure 4 is a rear elevation of the structure shown in Figure 3.
Figure 7:
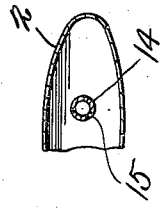
Figure 7 is a fragmental transverse section taken through one of the wings and showing the heating pipe therein.
Figure 6:
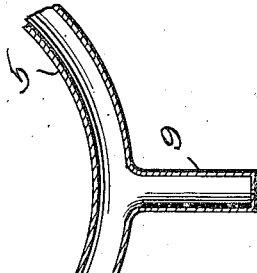
Figure 6 is a sectional view showing a part of the conduit through which the air passes.

An air conduit is provided, and, preferably, includes a loop shaped metal member 5 secured against the manifold 4 and adapted to be heated by the manifold. At one end the member 5 of the manifold is supplied with a band 6 including a depending arm 7 having a forwardly presented enlarged mouth 8. At the bottom of the loop shaped member 5 there is a downwardly projecting tubular extension or trap 9, provided at its lower end with a very small hole 10. The upper ends of the loop shaped member 5 of the air conduit are disposed close together, as Figure 4 will show, one end being the inlet end, as has been described hereinbefore. From the other end of the loop shaped member 5, a flexible pipe 11 extends backwardly.

There is a hand valve 12 in the pipe 11, so that the heat delivered to the wings 2 of the air craft may be regulated at the will of an operator. The pipe 11 preferably is provided with a heat insulating jacket 44, to prevent the loss of heat whilst the heated air is traveling backwardly to the wings of the plane.

In the wings 2 of the plane is located a loop shaped pipe 14, which, preferably, is made of metal. The pipe 14 has any desired number of small openings 15. The pipe 11 is connected to the loop shaped pipe 14. At one end, the loop shaped pipe 14 has a reduced outlet 16 which extends out of the wing, as shown in Figure 1.

Owing to the way in which the mouth 8 and the arm 7 of the loop shaped member 5 are arranged, air can find its way readily into the member 5, but rain or snow cannot so readily enter. The air passes into the loop shaped member 5 by way of the mouth 8 and is heated as it moves around through the member 5, the member 5, in its turn, being heated because it is fastened against the exhaust manifold. The air passes through the pipe 11, under the governance of the valve 12 and moves around through the loop shaped pipe 14, within the wings 2. In this way, the wings are kept reasonably warm, and ice will not be likely to form upon them. The outlet 16 is reduced in order to hold back the air a little, and make it pass through the openings 15 into the wing of the plane, but the surplus air leaves by way of the outlet 16. Any water which may happen to find its way into the loop shaped member 5 will run into the trap 9 and find exit through the hole 10.

What is claimed is:—

1. The combination with an air craft including a wing and an internal combustion engine having an exhaust, of an air conduit located partly in the wing and including a member arranged in loop shaped form in such position with respect to the manifold as to be heated thereby, one end of the loop shaped member having an air inlet.

2. The combination with an air craft including an engine and a wing, of an air conduit extended into the wing and including a loop shaped member disposed in such relation to the engine as to be heated by the engine, the lowermost portion of the loop shaped member being provided with a water trap, and the upper end of the loop shaped member being provided with an air inlet.

3. The combination with an air craft including an engine and a wing, of an air conduit extended into the wing and including a member disposed in such relation to the engine as to be heated by the engine, the lowermost portion of said member being provided with a water trap, and the upper end of said member being provided with an air inlet.

In testimony that I claim the foregoing as my own, I have hereto affixed my signature.

JAMES A. KIDD.